April 7, 1925.  
W. J. HAHN  
TONGS  
Filed March 26, 1923  
1,532,815  
2 Sheets-Sheet 2
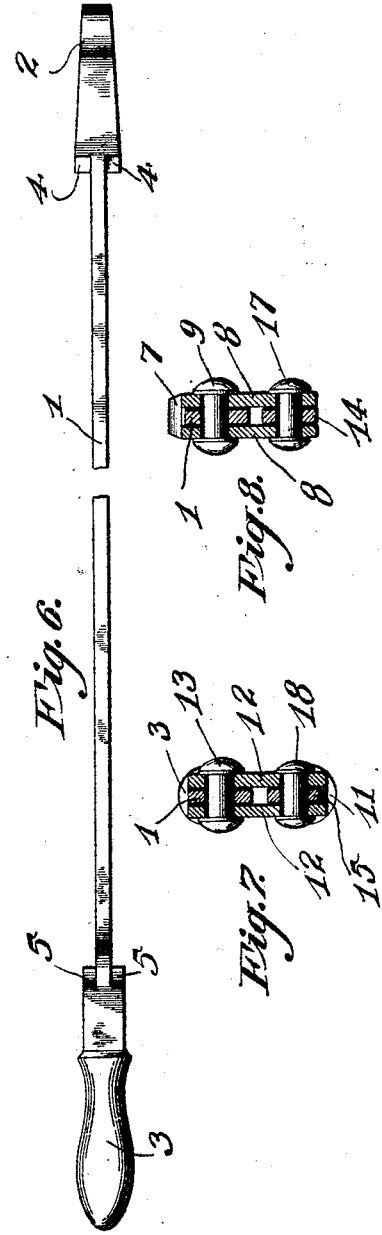
Inventor  
William J. Hahn Patented Apr. 7, 1925.

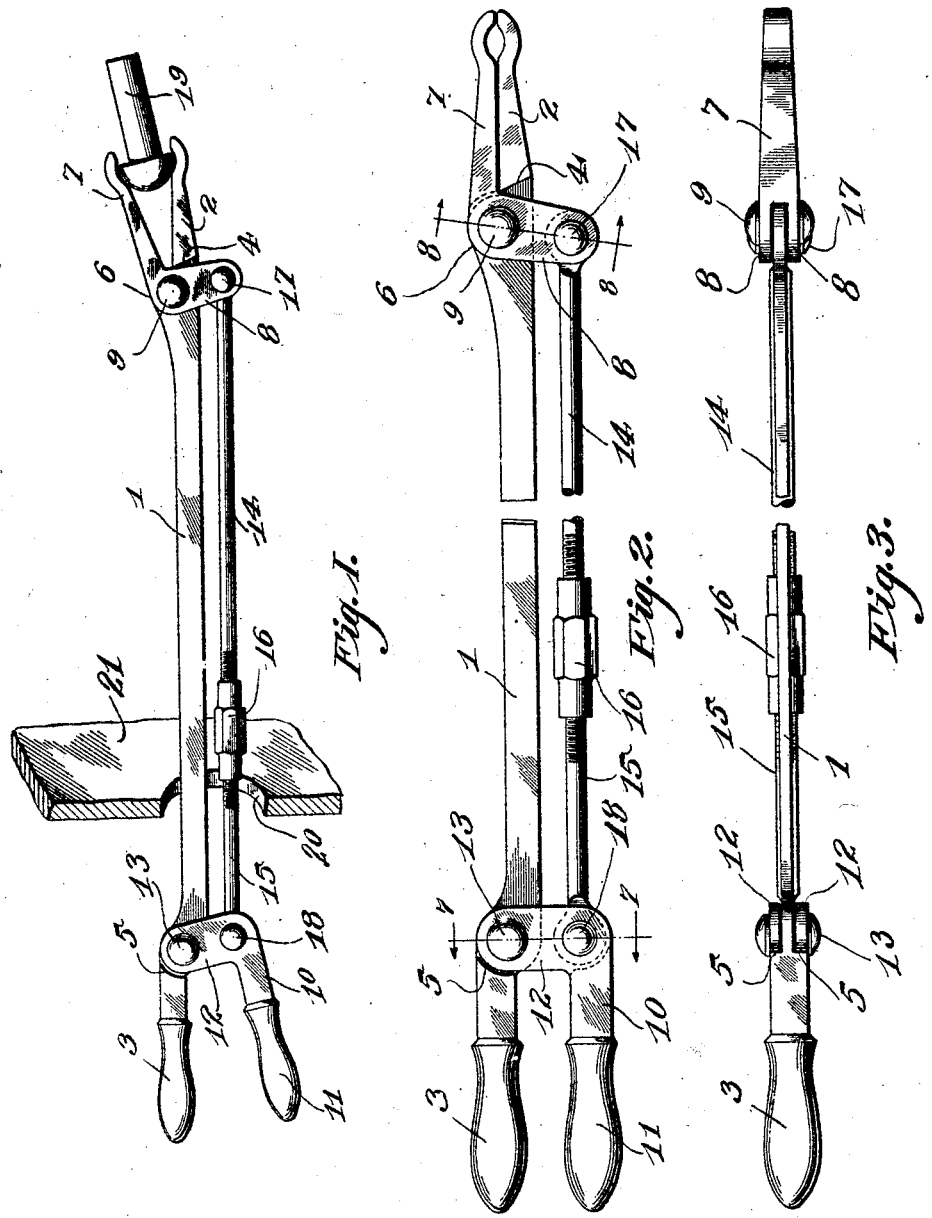

1,532,815

UNITED STATES PATENT OFFICE.

WILLIAM J. HAHN, OF PHILADELPHIA, PENNSYLVANIA.

TONGS.

Application filed March 26, 1923. Serial No. 627,607.

*To all whom it may concern:*

Be it known that I, WILLIAM J. HAHN, a citizen of the United States, residing at Philadelphia, in the county of Philadelphia and State of Pennsylvania, have invented certain new and useful Improvements in Tongs, of which the following is a specification.

My invention relates to tongs which are particularly adapted for use in heating and passing rivets or the like.

The object is to provide a pair of tongs which will always have the handles close together when gripping a rivet and thereby render possible a reach equal to the length of the tongs through a small hole when passing a rivet therethrough.

This object, and other advantageous ends which will be described hereinafter, I attain in the following manner, reference being had to the accompanying drawings in which—

Figure 1 is a side view of a pair of tongs constructed in accordance with my invention, illustrating the same passing a rivet through a small hole, Figure 2 a view similar to Figure 1 drawn on an enlarged scale illustrating the tongs in another position, Figure 3 a plan view of Figure 2, Figure 4 an inverted plan view of Figure 2, Figure 5 a central section through the tongs illustrating the body in full, Figure 6 a bottom view of the body, Figure 7 a section on line 7—7 of Figure 2, and Figure 8 a section on line 8—8 of Figure 2.

My improved tongs are especially useful where a long reach is required when passing a small object through a small hole.

Referring to the drawings, 1 is a body having one end formed into a jaw 2 and the other end into a handle 3. The jaw and handle are preferably wider than the body 1 to provide shoulders 4 and 5 respectively. The jaw 2 and handle 3 will hereinafter be called fixed jaw and fixed handle.

A bell crank lever 6 has a jaw 7 formed on one end and is bifurcated on the other end 8, the furcations being disposed on the opposite sides of the body 1 and fulcrumed thereto at 9. Another bell crank lever 10 has a handle 11 formed on one end and is bifurcated on the other end 12, the ends of the furcations being disposed on the opposite sides of the body 1 and pivoted thereto at 13. A connecting rod composed of sections 14 and 15 connected by a turn-buckle 16 has the end of section 14 pivoted at 17 to the bifurcated end 8 and on the end of section 15 is fulcrumed the bell crank lever 10 as shown at 18.

When my improved tongs are in use, it is very convenient to handle rivets or the like, it being necessary to use but one hand on the two handles. The other hand may be used to hold the body of the tongs to guide the rivet through the rivet hole. When it is desired to pass the rivet 19 through a small hole, such as is shown at 20, in plate 21 of Figure 1, the tongs may be easily passed through the hole as the handles are close together and a reach substantially equal to the length of the tongs is obtained. This reach is especially desirable when riveting any small compartments of a ship or the like. When using another size rivet, the turn-buckle is turned to adjust the length of the rod so that the movable handle 11 will be close to fixed handle 3 and thereby permit the two handles to be conveniently gripped by one hand of the user. The handles may be formed in various shapes to meet different requirements.

Having thus described my invention, what I claim as new and desire to secure by Letters Patent is:—

A device of the character described including a thin elongated shank member having a straight edge and opposite thereto an edge formed with a widened region adjacent each extremity, one of the extremities constituting a fixed jaw and the other extremity constituting a fixed handle, two bell crank levers each having their short arms bifurcated, the furcations of one bell crank lever disposed on the opposite sides of the widened region adjacent said shank handle and pivoted thereto, the furcations of the other bell crank lever disposed on opposite sides of the widened region adjacent said shank jaw and pivoted thereto, the long arm of one bell crank lever being formed to constitute a handle cooperative with said shank handle, the long arm of the other bell crank lever being formed to constitute a jaw cooperative with said shank jaw, the bifurcated short arms of the bell crank levers crossing and extending a distance beyond the straight edge of said shank member, and an adjustable connection pivotally connecting said bell crank levers, beyond the straight edge of said shank member, the extremities of said connection being pivoted between the furcations of the short arms of said bell crank levers, substantially as described.

In testimony whereof I have signed my name to this specification in the presence of two subscribing witnesses.

WILLIAM J. HAHN.

Witnesses:
CHAS. E. POTTS,
ELIZABETH GARBE.